United States Patent
Wu et al.

(10) Patent No.: US 10,292,332 B2
(45) Date of Patent: May 21, 2019

(54) STEPLESS VARIABLE SPEED CONTROL MECHANISM FOR A LAWN MOWER

(71) Applicant: Ningbo NGP Industry Co., Ltd., Ningbo (CN)

(72) Inventors: Chuanchun Wu, Ningbo (CN); Yanan Yang, Ningbo (CN); Jianxin Liang, Ningbo (CN)

(73) Assignee: Ningbo NGP Industry Co., Ltd., Ningbo (CN)

( * ) Notice: Subject to any disclaimer, the term of this patent is extended or adjusted under 35 U.S.C. 154(b) by 78 days.

(21) Appl. No.: 15/548,641

(22) PCT Filed: Jul. 22, 2016

(86) PCT No.: PCT/CN2016/000410
§ 371 (c)(1),
(2) Date: Aug. 3, 2017

(87) PCT Pub. No.: WO2017/165993
PCT Pub. Date: Oct. 5, 2017

(65) Prior Publication Data
US 2018/0116119 A1    May 3, 2018

(30) Foreign Application Priority Data
Mar. 29, 2016  (CN) .......................... 2016 1 0188591

(51) Int. Cl.
*A01D 69/06*  (2006.01)
*F16H 59/04*  (2006.01)
(Continued)

(52) U.S. Cl.
CPC .......... *A01D 69/06* (2013.01); *A01D 34/6806* (2013.01); *B60K 17/08* (2013.01); *F16H 59/0278* (2013.01); *F16H 59/04* (2013.01); *F16H 59/041* (2013.01); *A01D 2034/6843* (2013.01); *A01D 2101/00* (2013.01)

(58) Field of Classification Search
CPC .... F16H 59/041; F16H 59/0278; F16H 59/04; F16H 9/12; F16H 9/125; B60K 17/08; B60K 17/00; B60K 17/342; B60K 26/04; B60K 17/354; A01D 69/06; A01D 34/6806; A01D 2101/00; A01D 2034/6843;
(Continued)

(56) References Cited

U.S. PATENT DOCUMENTS 4,907,401 A * 3/1990 Nemoto ............. A01D 34/6806
                                                              56/11.3
4,991,382 A * 2/1991 Scag .................. A01D 34/6806
                                                              180/315
(Continued)

*Primary Examiner* — Arpad Fabian-Kovacs
(74) *Attorney, Agent, or Firm* — Wang Law Firm, Inc.

(57) ABSTRACT

A stepless speed regulating control mechanism for a mower includes a push handle, a self-propelled lever, a speed regulating cable and a regulating mechanism; the mower has a base and a self-propelled device; the regulating mechanism includes a regulating sleeve and a speed regulating sleeve; the self-propelled lever pulls the regulating sleeve and causes the speed regulating sleeve to move simultaneously with the regulating sleeve, so as to pull the speed regulating cable, and the speed regulating sleeve can move relative to the regulating sleeve, so as to pull the speed regulating cable.

9 Claims, 4 Drawing Sheets

(51) Int. Cl.
  *A01D 34/68* (2006.01)
  *B60K 17/08* (2006.01)
  *F16H 59/02* (2006.01)
  *A01D 101/00* (2006.01)

(58) Field of Classification Search
  CPC .. A01D 34/69; A01D 34/68; B60Y 2200/225; A01B 33/028; A01B 33/082
  See application file for complete search history.

(56) References Cited

U.S. PATENT DOCUMENTS

| | | | | |
|---|---|---|---|---|
| 5,088,273 A * | 2/1992 | Braun | ............... | A01D 34/6818 56/10.5 |
| 5,138,824 A * | 8/1992 | Oshima | ............. | A01D 34/6806 56/10.2 R |
| 5,355,662 A * | 10/1994 | Schmidt | ............. | A01D 34/6812 180/19.3 |
| 6,475,109 B2 * | 11/2002 | Blanchard | ................ | F16H 7/14 474/101 |
| 7,178,322 B2 * | 2/2007 | Osborne | ............. | A01D 34/824 56/10.8 |
| 7,318,309 B2 * | 1/2008 | Osborne | ............ | A01D 34/6806 180/19.3 |
| 8,226,508 B2 * | 7/2012 | Osborne | ............ | A01D 34/6806 474/101 |
| 8,312,946 B2 * | 11/2012 | Lahey | .................. | A01D 34/824 180/19.1 |
| 9,163,707 B2 * | 10/2015 | Helin | ................. | A01D 34/6806 |
| 9,538,699 B1 * | 1/2017 | Bejcek | ................ | A01D 34/006 |
| 9,677,648 B2 * | 6/2017 | Wadzinski | ............ | F16H 7/0827 |
| 2003/0006073 A1 * | 1/2003 | Iida | .................... | A01D 34/6806 180/19.1 |
| 2006/0211540 A1 * | 9/2006 | Moriyama | ......... | A01D 34/6806 477/166 |
| 2007/0169743 A1 * | 7/2007 | Kobayashi | ............. | A01D 34/67 123/352 |
| 2010/0004093 A1 * | 1/2010 | Raasch | .................. | B60K 26/04 477/111 |
| 2010/0192532 A1 * | 8/2010 | Slater | .................. | A01B 33/028 56/11.5 |
| 2013/0046448 A1 * | 2/2013 | Fan | ........................ | A01D 34/68 701/50 |
| 2014/0345416 A1 * | 11/2014 | Kaskawitz | ............ | A01D 34/68 74/523 |

\* cited by examiner

STEPLESS VARIABLE SPEED CONTROL MECHANISM FOR A LAWN MOWER

RELATED APPLICATIONS

This application is a national phase entrance of and claims benefit to PCT Application for a stepless speed regulating control mechanism for a mower, PCT/CN2016/000410, filed on Jul. 22, 2016, which claims benefit to Chinese Patent Applications 201610188591.9, filed on Mar. 29, 2016. The specifications of both applications are incorporated here by this reference.

TECHNICAL FIELD OF THE INVENTION

The present invention relates to garden equipment, and particularly to a mower.

BACKGROUND OF THE INVENTION

A mower, also known as a weeder, a grass cutter, a lawn trimmer, etc, is a mechanical tool for trimming a lawn, vegetation and so on, which is composed of a cutter head, an engine, walking wheels, a walking mechanism, a blade, a handle, and a control part.

There now exist two types of mowers, i.e., hand-push type and self-propelled type. Forward Walking of a hand-push type mower completely relies on hand push without any power from the walking wheels thereof. A clutch is disposed on a walking wheel of a self-propelled type mower; by means of connection of a crankshaft-connected belt wheel on an engine with a belt wheel on the clutch, engagement and disengagement of the clutch are achieved by manually pulling a clutch handle to realize rotation of the walking wheel, and only the direction needs to be controlled manually after a self-propelled mode is activated. Self-propelled devices of the mowers in the prior art are provided with either a clutch mechanism or a stepless variable-speed mechanism, and most of them are controlled by cables respectively, which is a well-known technical solution. Certainly, there also exists a self-propelled device in which a clutch is integrated with a stepless variable-speed mechanism. However, all mowers that are generally available in the market have only one way of speed regulation; that is, a clutch handle is pulled to achieve engagement of a self-propelled device allowing regulation of the mower to a self-propelled mode, and a clutch in the self-propelled device is disengaged after the clutch handle is released, thereby achieving regulation to a hand push mode.

There have emerged on the market many stepless speed regulation mechanisms to achieve controlling the forward speed of a mower through only stepless variable-speed regulation, for example, in a walking stepless variable-speed regulation mechanism of a lawn mower disclosed by Chinese patent No. CN203511292U, a variable speed belt wheel set is disposed between a driven belt wheel and a driving belt wheel, which is connected to the driven belt wheel and the driving belt wheel by using a first speed changing cut-edged belt and a second speed changing cut-edged belt, respectively, and the contact radius of the two speed changing cut-edged belts is changed by a cable driven by pulling a speed changing lever to achieve stepless variable-speed regulation of the mower. It is well-known that compared with disposing a tensioning wheel between the driving and driven belt wheels in the prior art, such a stepless variable-speed regulation mechanism having the variable speed belt wheel set disposed between the driving and driven belt wheels is complex in structure and requires massive corresponding improvement on a chassis, thus leading to increased manufacturing cost.

For another example, as disclosed in a Chinese patent with a patent number of CN105325128A, a self-propelled device is pulled by means of a cable, and thus enabled to rotate up and down around a driving shaft to thereby tension or loosen a driving belt, leading to increased or reduced friction between the belt wheel and the belt to achieve stepless speed change. In the process of rotating the self-propelled device, the cable in connection with the self-propelled device is driven by a speed regulating handle; that is, the forward speed of the mower is determined by a distance between the cable and the speed regulating handle in the speed regulation process. However, in this patent, a self-propelled lever, a push handle and the speed regulating handle are disposed spaced apart from each other in the front-back direction, and activation of engagement and disengagement and the speed regulation process are both carried out by pulling the handles; and therefore, the operation process is too complicated and prone to cause confusion and misoperation of a user.

SUMMARY OF THE INVENTION

A technical problem to be solved by the present invention is to provide a stepless speed regulating control mechanism for a mower that is convenient for operation and adjustment.

To solve the technical problem mentioned above, the mower have a base and a self-propelled device with a shell, the stepless speed regulating control mechanism comprises: a push handle having at least one long arm extending up and backwardly from the base of the mower;

a self-propelled lever connected to the push handle;

a speed regulating cable connected to the self-propelled device, allowing regulation of the speed of the self-propelled device when the speed regulating cable is pulled;

a regulating mechanism;

wherein speed of the self-propelled device can be regulated through the speed regulating cable;

the regulating mechanism further comprises a regulating sleeve and a speed regulating sleeve connected to the push handle; the regulating sleeve is connected to the self-propelled lever, and the speed regulating sleeve is connected to the speed regulating cable;

the self-propelled lever pulls the regulating sleeve and causes the speed regulating sleeve to move simultaneously with the regulating sleeve, so as to pull the speed regulating cable, and the speed regulating sleeve can move relative to the regulating sleeve, so as to pull the speed regulating cable.

Preferably, the regulating sleeve comprises a connecting sleeve connected to the self-propelled lever, and a rotating sleeve coaxially fixed to the connecting sleeve and capable of rotating, and the rotating sleeve is in threaded connection with the speed regulating sleeve, with a circumferential stop means disposed between the speed regulating sleeve and the push handle to prevent the speed regulating sleeve from rotating relative to the push handle.

Preferably, the regulating sleeve and the rotating sleeve are sleeved on the push handle.

Preferably, the speed regulating sleeve comprises a first section in threaded connection with the rotating sleeve, and a second section connected with the speed regulating cable, an internal surface of the rotating sleeve being provided with internal treads, and an external surface of the first section of the speed regulating sleeve being provided with external threads for connection with the rotating sleeve.

To facilitate installation of the connecting sleeve and the rotating sleeve, the connecting sleeve comprises an inner sleeve, and an outer diameter of the inner sleeve is smaller than an inner diameter of the rotating sleeve and one end of the inner sleeve is plugged in the rotating sleeve; a retainer ring is disposed on one end of the inner sleeve and retained on an inner shoulder of the rotating sleeve; an outer sleeve is fixedly sleeved on an outside portion of the inner sleeve that is exposed from the rotating sleeve, and an outer diameter of the outer sleeve is greater than an inner diameter of the rotating sleeve.

To achieve that the self-propelled lever pulls the speed regulating sleeve and the regulating sleeve more stably with a guiding effect, a guide bar is sleeved between each of the regulating sleeve and the speed regulating sleeve and the push handle; the guide bar is fixedly connected to the push handle, and the regulating sleeve and the speed regulating sleeve are capable of rotating around the guide bar; a circumferential stop means is defined by a protruded ridge disposed on an external surface of the guide bar and extending axially along the guide bar, and a groove is defined in the internal surface of the speed regulating sleeve and matching with the protruded ridge.

To prevent the connecting sleeve from circumferentially rotating relative to the push handle, a groove matched with the protruded ridge is also defined on an internal surface of the connecting sleeve.

Preferably, the self-propelled lever is connected to the regulating sleeve by a connecting cable.

Preferably, the push handle comprises two long arms extending up and backwards from two sides of the base, and a holding portion between the two long arms; the self-propelled lever comprises two lateral portions located on two sides and an intermediate portion connected to the two lateral portions; ends of the lateral portions are hinged to the long arms.

For the sake of convenient operation, the self-propelled lever is located below the holding portion of the push handle; the regulating mechanism is disposed on one of the long arm; the self-propelled lever pulls the speed regulating cable to move upwards when moving up towards the holding portion.

Preferably, the external surface of the outer sleeve is provided with a hook for connection with the connecting cable.

Preferably, the external surface of the second section of the speed regulating sleeve is provided with a hook for in connection with the speed regulating cable.

To achieve return of the self-propelled device after the self-propelled lever is loosened, a return spring is connected between a shell of the self-propelled device and the base, and the return spring enables the self-propelled device to slant forward.

To facilitate regulation of the speed the self-propelled device, a bulging ring protruding outwards for facilitating regulation is disposed outside the rotating sleeve.

To achieve the effects of engagement and disengagement by both pulling and loosening of the self-propelled lever regardless of the condition of the regulating mechanism, the distance of the speed regulating cable pulled by the self-propelled lever is greater than or equal to that of the speed regulating cable pulled by the regulating mechanism 7.

Compared with the prior art, the present invention has the following advantages: the stepless speed regulating control mechanism for a mower is not only convenient for speed regulation to facilitate stepless speed regulation, but also reasonable in design and convenient for speed regulation operation without causing confusion and misoperation. Besides, the stepless speed regulating control mechanism is low in cost, and easy to manufacture and operate.

DETAILED DESCRIPTION OF THE INVENTION

To enable a further understanding of the present invention content of the invention herein, refer to the detailed description of the invention and the accompanying drawings below:

FIG. 1-FIG. 6 show a preferred embodiment of the present invention. A mower 1 generally comprises a base 11, an engine 12 fixed to the base 11, and a push handle 2 extending up and backwardly from the base 11. In the present application, forward and backward directions described below are determined based on a walking direction of the mower 1 as the forward direction. The push handle 2 has at least one long arm 21 located on two sides, and a holding portion 23 extending crosswise between the tops of the two long arms 21 on the two sides. An output shaft of the engine 12 is connected to a horizontally disposed driving wheel. A horizontally disposed belt 9 is sleeved on the driving wheel and the other end of the belt 9 is sleeved on a belt wheel 31 of a self-propelled device 3.

Figure 1:
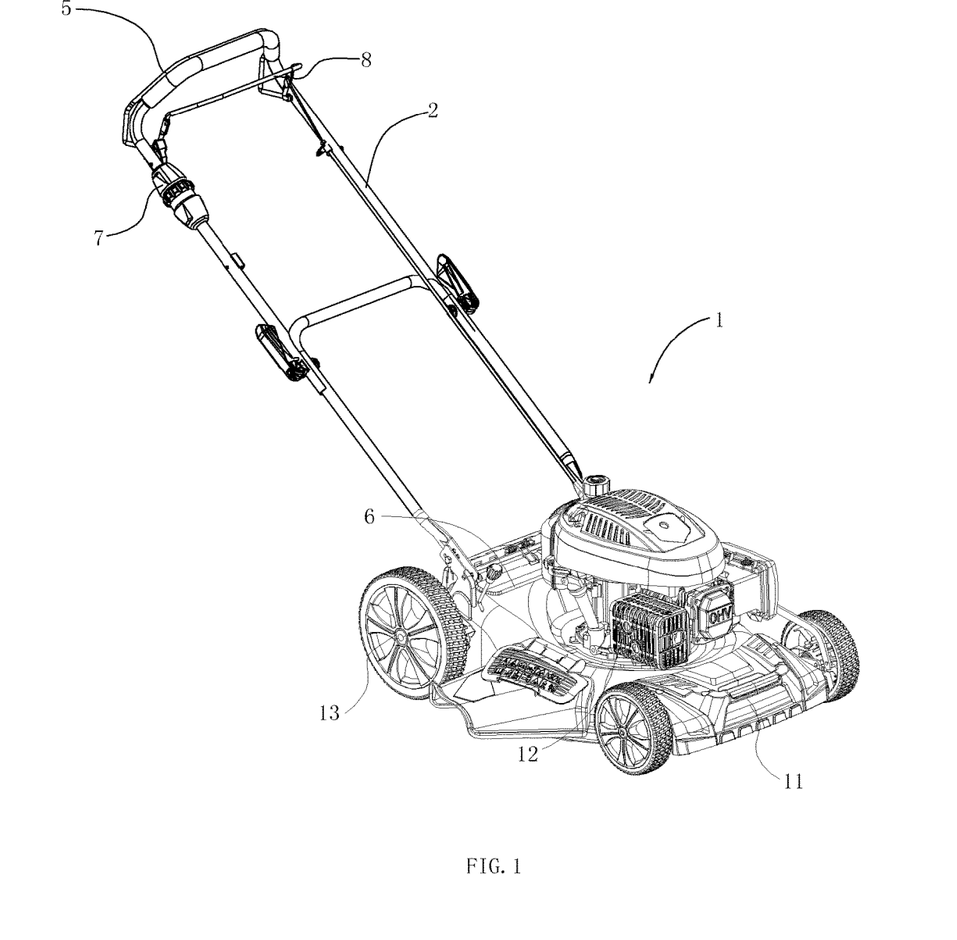
FIG. 1 is a perspective view of a stepless speed regulating control mechanism for a mower according to an embodiment of the present invention.
Figure 2:
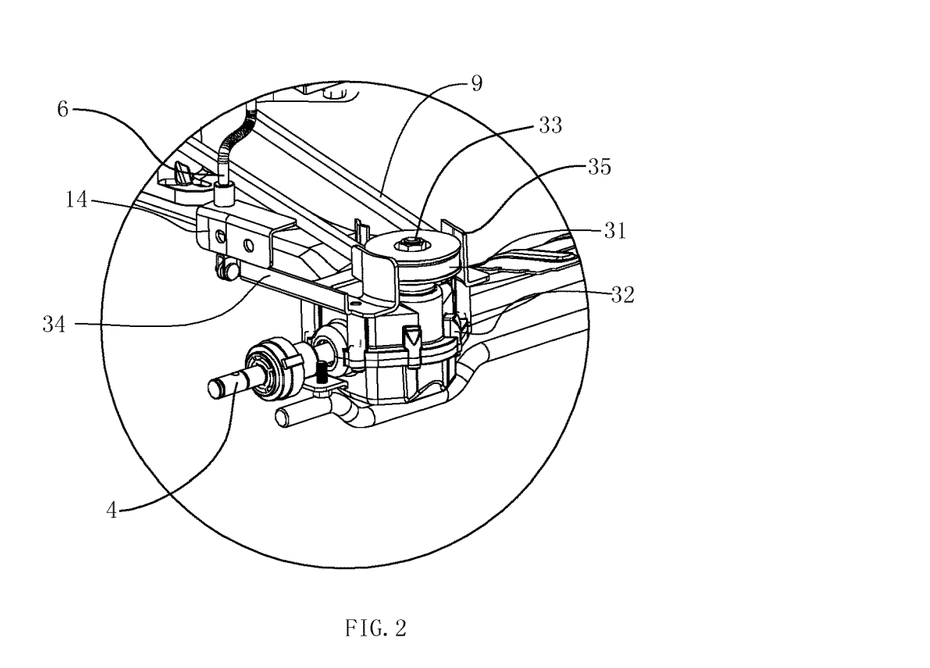
FIG. 2 is a perspective view showing the connection of a self-propelled device shell and a driving shaft, as well as a driving wheel and a driving belt connection diagram.

The self-propelled device 3, as shown in FIG. 2, is fixed to a walking driving shaft 4, two ends of the walking driving shaft 4 being fixedly connected to two rear wheels 13 mounted at the rear side of the base 11, and the belt wheel 31 of the self-propelled device 3 is driven by the engine 12 to rotate to cause the walking driving shaft 4 to rotate such that the rear wheels 13 rotate to achieve self-propelled walking. The self-propelled device 3 comprises a shell 32. The walking driving shaft 4 crosswise runs through the shell 32 of the self-propelled device 3. The belt wheel 31 is located outside the top of the shell 32 with a rotating shaft 33 of the belt wheel 31 extending into the shell 32 to be in transmission connection with the walking driving shaft 4. Rotation of the belt wheel 31 causes rotation of the rotating shaft 33, thus causing the walking driving shaft 4 to rotate around its own axial direction. The self-propelled device 3 is not fixed to the base 11, thus allowing the self-propelled device 3 and the walking driving shaft 4 to swing forwards and backwards around the axial direction of the walking driving shaft 4.

Figure 5A:
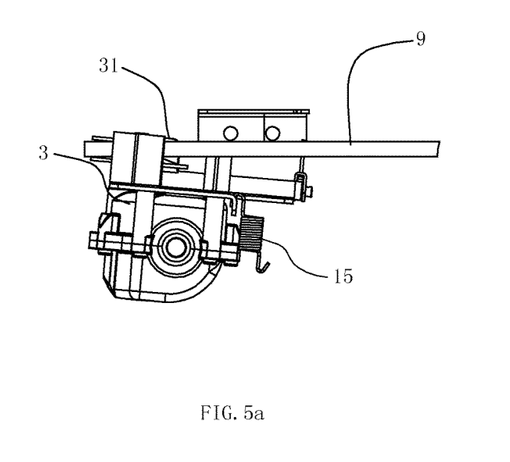
FIG. 5a is a perspective view of a state of a self-propelled device (belt loose state).
Figure 5B:
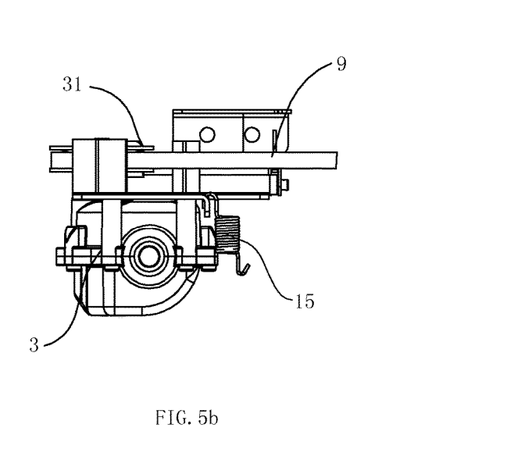
FIG. 5b is a perspective view of a state of the self-propelled device (belt tensioned state).

As shown in FIG. 5a, the self-propelled device 3 slant downwards and forwards around the walking driving shaft 4, leading to a reduced distance between the belt wheel 31 and the driving wheel disposed on the output shaft of the engine 12, and thus the belt 9 trends to be in a loose state with reduced friction between the belt 9 and the belt wheel 31 such that the speed of the driving wheel or the belt 9 is not completely transferred to the belt wheel 31. Under this circumstance, the rotational speed of the belt wheel 31 is low; that is, the speed of the self-propelled device 3 is low. As shown in FIG. 5b, when the self-propelled device 3 and the belt wheel 31 are in horizontal state parallel to the belt 9, the distance between the belt wheel 31 and the driving wheel disposed on the output shaft of the engine 12 increases and the belt 9 and the belt wheel 31 are both tensioned completely with maximum friction therebetween. Under this circumstance, the speed of the belt 9 is completely transferred to the belt wheel 31; that is, the speed of the self-propelled device 3 is highest under this circumstance. Therefore, the force of friction and the degree of fitting between the belt wheel 31 and the belt 9 can be regulated by regulating the forward tilting angle of the self-propelled device 3 relative to the belt 9 such that the speed of the belt 9 is completely or not completely transferred to the belt wheel 31, thus achieving regulation of the speed of the self-propelled device. The principles of this part have been described in detail in patents CN101697680A (patent No. 200910207840.4) and CN105325128A (application No. 201510851600.3) filed previously by the present applicant with the same principle of speed regulation, which is not described redundantly herein.

As shown in FIG. 2, a left limit stop 34 and a right limit stop 35 are disposed on two sides of the belt wheel 31 at the top of the shell 32 of the self-propelled device 3, respectively. The left and right limit stops are both fixedly connected to the shell 32 of the self-propelled device 3 and extend from the rear sides to the front sides of the two ends of the self-propelled device 3. Moreover, a first end of a speed regulating cable 6 is fixedly connected to the left limit stop 34; that is, the first end of the speed regulating cable 6 is connected to the front side of the shell 32. The left limit stop 34 can be driven to rotate upwards by pulling the speed regulating cable 6; that is, the forward tilting angle of the self-propelled device 3 relative to the belt 9 can be regulated, thereby allowing speed regulation on the self-propelled device 3. Furthermore, a limiting plate 14 located above the left limit stop 34 to prevent the left limit stop 34 from being excessively upward is fixedly disposed on the base 11. Further, a return spring 15 is connected between the shell 32 of the self-propelled device 3 and the base 11, and the return spring 15 enables the self-propelled device 3 to slant forward. When the self-propelled device 3 is in the position of maximum forward tilting, a limiting structure provided between the self-propelled device 3 and the base 11 prevents the self-propelled device 3 from excessively slanting downwards.

Two ends of a self-propelled lever 5 are hinged to the tops of the two long arms 21 on the two sides, and the self-propelled lever 5 is located below the holding portion 23 of the push handle 2 and capable of swinging forwards and backwards relative to the holding portion 23. A flameout handle 8 is also disposed on the front side of the holding portion 23 of the push handle 2 with two ends of the flameout handle 8 also hinged to the tops of the two long arms 21 on the two sides and capable of swinging forwards and backwards relative to the holding portion 23 as well. In addition, the flameout handle 8 is connected to a flameout cable in connection with the engine.

The self-propelled lever 5 is connected to a first end of a regulating mechanism 7 and a second end of the regulating mechanism 7 is connected to a second end of the speed regulating cable 6. Preferably, the self-propelled lever 5 is connected to the regulating mechanism 7 by a connecting cable 61; that is, two ends of the connecting cable 6 are connected to the self-propelled lever 5 and the first end of the regulating mechanism 7, respectively.

The regulating mechanism 7 is sleeved on the push handle 2. When the self-propelled lever 5 is pushed to move towards or away from the holding portion 23 of the push handle 2, the self-propelled lever 5 pulls the speed regulating cable 6 by the regulating mechanism 7. Besides, specific configuration of the self-propelled lever 5 is not necessarily limited to the above-mentioned structure as long as the self-propelled lever 5 is connected to the push handle 2 and connected to the second end of the speed regulating cable 6 by the regulating mechanism 7 and can pull the speed regulating cable 6 by the regulating mechanism 7 to thereby enables the first end of the speed regulating cable 6 to move up and down.

Preferably, the self-propelled lever 5 comprises lateral portions 51 located on two sides and an intermediate portion 52 connected to the lateral portions 51 on the two sides and located therebetween. The ends of the lateral portions 51 are hinged to the tops of the two long arms 21. Additionally, the lateral portions 51 have first sections 511 bent from the long arms 21 downwards first in a direction away from the long arms 21, and second sections 512 bent from the first sections 511 upwards in a direction close to the holding portion 23. Therefore, when the intermediate portion 52 of the self-propelled lever 5 is pulled towards the holding portion 23 of the push handle 2, the connecting cable 61 can be pulled upwards with the motion of the self-propelled lever 5 as the connecting cable 61 is connected to the first sections 511. A limiting block 22 can also be disposed between one end of the self-propelled lever 5 and the push handle 2 to limit a distance the self-propelled lever 5 rotates downwards away from the push handle 2.

Figure 3:
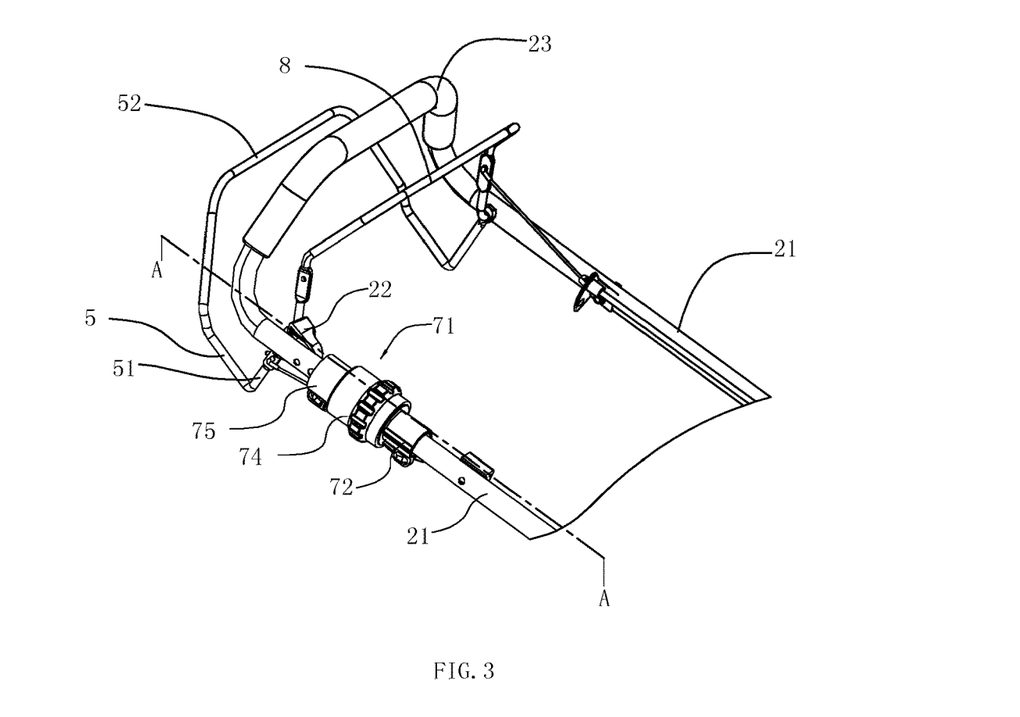
FIG. 3 is a perspective view of a regulating mechanism of the stepless speed regulating control mechanism according to the embodiment of the present invention with a housing removed.
Figure 4:
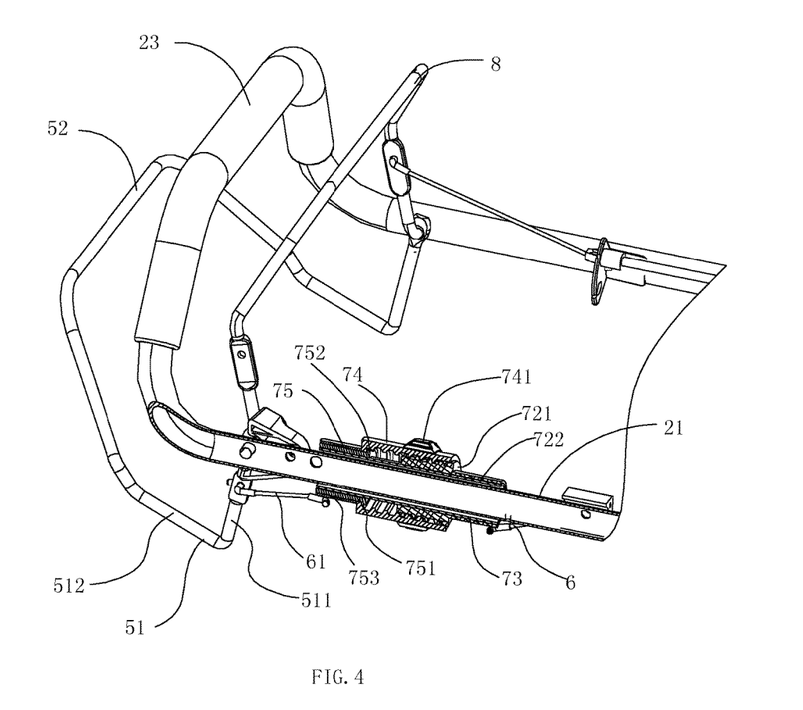
FIG. 4 is a partial sectional view of line A-A in FIG. 3.
Figure 6:
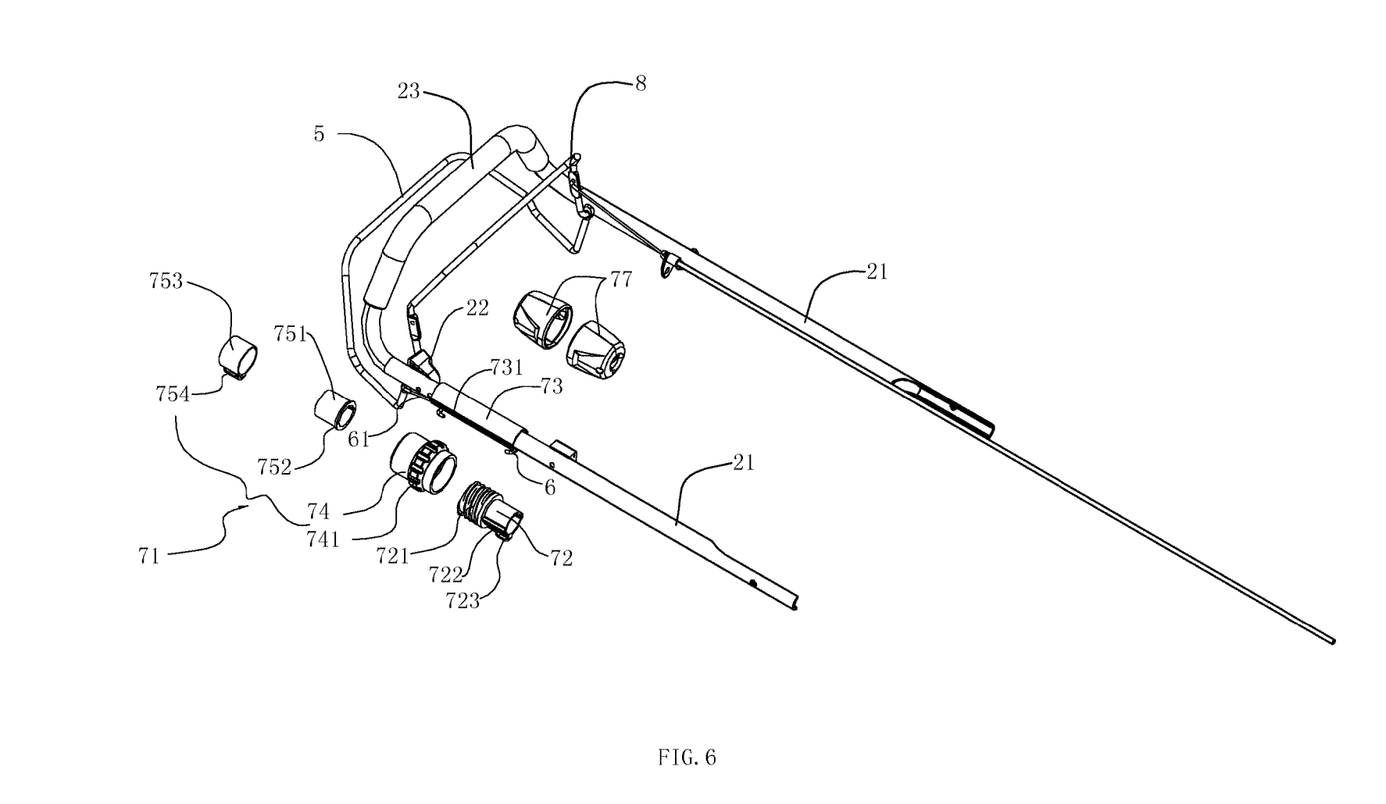
FIG. 6 is an exploded view of the regulating mechanism of the stepless speed regulating control mechanism according to the embodiment of the present invention.

As shown in FIG. 3, FIG. 4 and FIG. 6, the second end of the speed regulating cable 6 is located at one side of the long arm 21 on the right. The regulating mechanism 7 is sleeved on the long arm 21 on the right and comprises a regulating sleeve 71 and a speed regulating sleeve 72 that are successively sleeved on the long arm 21 on the right side of the push handle 2. As shown in FIG. 3, FIG. 4 and FIG. 6, the regulating sleeve 71 and the speed regulating sleeve 72 are disposed successively up and down.

The regulating sleeve 71 comprises a connecting sleeve 75 and a rotating sleeve 74 that are connected successively up and down. The connecting sleeve 75 and the rotating sleeve 74 are axially fixed to each other and rotate circumferentially. The connecting sleeve 75 and the rotating sleeve 74 are both sleeved on a guide bar 73 that is sleeved outside the long arm 21 and is fixedly connection with the long arm 21; that is, the guide bar 73 is located between the long arm 21 and the regulating sleeve 71. A protruded ridge 731 is disposed on an external surface facing the connecting sleeve 75 and extends axially along the guide bar 73, and a groove matched with the protruded ridge 731 is defined on an internal surface of the connecting sleeve 75. a circumferential stop means between the connecting sleeve 75 and the long arm 21 is defined by the protruded ridge 731 on the guide bar 73 and the groove in the connecting sleeve 75 to prevent the connecting sleeve 75 from circumferentially rotating around the long arm 21. In addition, the circumferential stop means can not necessarily be disposed in the above way, and can be disposed in such a way of, for example, providing the protruded ridge 731 directly on an external surface of the long arm 21 with the guide bar 73 omitted. The connecting sleeve 75 is defined by the first end of the regulating mechanism 7 that is in fixed connection with the connecting cable 61.

An internal surface of the rotating sleeve 74 is provided with internal threads. An external surface of the upper portion or a first section 721 of the speed regulating sleeve 72 is provided with external threads matched with the internal threads of the regulating sleeve 71. The rotating sleeve 74 is in threaded connection with the first section 721 of the speed regulating sleeve 72; that is, the speed regulating sleeve 72 is in threaded connection with the regulating sleeve 71. The lower portion or a second section 722 of the speed regulating sleeve 72 is the second end of the regulating mechanism 7, and the second section 722 is connected to the second end of the speed regulating cable 6. The speed regulating sleeve 72 is also sleeved outside the guide bar 73. The regulating sleeve 71 is capable of driving the speed regulating sleeve 72 to slide along the guide bar 73. A protruded ridge 731 extending axially along the guide bar 73 is also disposed on the external surface, facing the speed regulating sleeve 72, of the guide bar 73, and a groove matched with the protruded ridge 731 is defined in an internal surface of the speed regulating sleeve 72. The protruded ridge 731 on the guide bar 73 and the groove in the internal surface of the speed regulating sleeve 72 form a circumferential stop means between the speed regulating sleeve 72 and the long arm 21. In addition, the circumferential stop means can be disposed in other ways, for example, providing the protruded ridge directly on the external surface of the long arm 21 of the push handle 2 and providing the groove in the internal surface of the speed regulating sleeve 72, or interchanging the positions of the protruded ridge and the groove, as long as the circumferential stop means can limit the speed regulating sleeve 72 to be circumferentially fixed relative to the long arm 21 and thus only capable of axially moving. Therefore, by rotating the rotating sleeve 74 of the regulating sleeve 71, the speed regulating sleeve 72 can be caused to move along the long arm 21, thus pulling the speed regulating cable 6. In other words, the speed regulating sleeve 72 is capable of moving along the push handle 2 relative to the regulating sleeve 71, and thus the speed regulating sleeve 72 pulls the first end of the speed regulating cable 6 to move up and down, thereby regulating the speed of the self-propelled device 3.

For the sake of convenient installation and connection, a gap is provided between the rotating sleeve 74 and the external surface of the guide bar 73. The connecting sleeve 75 comprises an inner sleeve 751 that is uniform in radial dimension and has an outer diameter smaller than the inner diameter of the rotating sleeve 74. One end of the inner sleeve 751 is plugged into the inner side of the top of the rotating sleeve 74, and a retainer ring 752 radially protruding is disposed on one end of the inner sleeve 751 and retained on an inner shoulder of the rotating sleeve 74. An outer sleeve 753 is fixedly disposed on the outside portion of the inner sleeve 751 that is exposed from the rotating sleeve 74, and connected to the connecting cable 61. Moreover, the outer diameter of the outer sleeve 753 is greater than the inner diameter of the rotating sleeve 74. During installation, the inner sleeve 751 is passed through the rotating sleeve 74 from bottom to top, and the outer sleeve 753 is fixedly sleeved at the portion, exposed from the rotating sleeve 74, of the inner sleeve 751 after the retainer ring 752 is retained on the inner shoulder of the rotating sleeve 74. The outer sleeve 753 prevents the inner sleeve 751 from retracting into the rotating sleeve 74, and is connected to the connecting cable 61.

A bulging ring 741 protruding outwards that is convenient for regulation is disposed outside the rotating sleeve 74. Additionally, a cap 77 is sleeved on the regulating sleeve 71 above the bulging ring 741, and a cap 77 also is sleeved outside the lower portion 722 of the speed regulating sleeve 72. Moreover, the positions of the threads can also be interchanged for the regulating sleeve 71 and the speed regulating sleeve 72; that is, the external surface of the rotating sleeve 74 of the regulating sleeve 71 is provided with the external threads, and an internal surface of the upper portion 721 of the speed regulating sleeve 72 is provided with internal threads, and both threads are connection with each other, so long as the speed regulating sleeve 72 can be driven to move along the push handle 2 relative to the regulating sleeve 71 by turning the rotating sleeve 74 of the regulating sleeve 71. The inner side of the outer sleeve 753 is provided with a hook 754 for connection with the connecting cable 61, and the outer side of the second section 722 of the speed regulating sleeve 72 is also provided with a hook 723 for connection with the speed regulating cable 6.

In addition, according to the regulating mechanism, when the speed regulating sleeve 72 is plugged into the uppermost position of the threads inside the regulating sleeve 71, the self-propelled lever 5 is moved to a position against the push handle 2 i.e., when the speed regulating cable 6 is pulled upwards to the highest point, the belt wheel 31 of the self-propelled device 3 and the belt 9 are parallel and tensioned. When the self-propelled lever 5 is completely loosened at the bottom and the regulating sleeve 72 is still in the uppermost position of the threads, the belt wheel 31 of the self-propelled device and the belt 9 should be in a fully tilted state; that is, the self-propelled device 3 is located in the position of tilting relative to the belt 9 at the maximum angle, and the distance of the speed regulating cable 6 pulled by the self-propelled lever 5 should be greater than or equal to that of the speed regulating cable 6 pulled by the regulating mechanism 7. That is to say, regardless of the state of the regulating mechanism 7 is, control on disengagement or engagement of the belt wheel 31 and the belt 9 can be achieved by loosening or tensioning of the self-propelled lever 5.

According to the stepless speed regulating control mechanism, in an initial state. i.e., when the mower is out of service, the self-propelled lever 5 is located below and away from the holding portion 23 of the push handle. After the engine of the mower 1 starts operation, if the mower needs to be driven by the self-propelled device to walk, the self-propelled lever 5 is pulled upwards to the top from bottom first, and the connecting sleeve 75, the rotating sleeve 74 and the speed regulating sleeve 72 are pulled to move together upwards along the guide bar 73 by the self-propelled lever 5 via the connecting cable 61; thus, the speed regulating cable 6 pulls the self-propelled device 3 upwards, allowing mutual transmission between the belt wheel 31 and the belt 9, and the self-propelled lever 5 serves as a clutch. In this case, by turning the rotating sleeve 74, the speed regulating sleeve 72 can be adjusted to drive the speed regulating cable 6 to move up and down, thus allowing regulation of the speed of the self-propelled device 3. Moreover, the positions of the speed regulating sleeve 72 and the rotating sleeve 74 are not changed when the rotating sleeve 74 is loosened; that is, the regulated speed can be stabilized. The speed of the self-propelled device 3 is lowest when the speed regulating sleeve 72 is located at the bottom of the threads of the regulating sleeve 71 and highest when the speed regulating sleeve 72 moves upwards to the top of the threads of the regulating sleeve 71, and in this case, the belt 9 can be thrown into a loose state by loosening the self-propelled lever 5 as the the distance of the speed regulating cable 6 that can be pulled by the self-propelled lever 5 is greater than that of the speed regulating cable 6 adjusted by the regulating mechanism, resulting in no friction between the belt 9 and the belt wheel 31 and consequently zero speed of the self-propelled device 3.

The stepless speed regulating control mechanism of a mower is not only convenient for speed regulation and for stepless speed regulation, but also reasonable in design and convenient for speed regulation operation without causing confusion and misoperation. Besides, the stepless speed regulating control mechanism is low in cost, and easy to manufacture and operate.

The protection scope of the present invention is not limited to each embodiments described in this description. Any changes and replacements made on the basis of the scope of the present invention patent and of the description shall be included in the scope of the present invention patent.

The invention claimed is:

1. A stepless speed regulating control mechanism for a mower, the mower having a base and a self-propelled device with a shell, the stepless speed regulating control mechanism comprising:
   a push handle having at least one long arm extending up and backwardly from the base of the mower;
   a self-propelled lever connected to the push handle;
   a speed regulating cable connected to the self-propelled device;
   a regulating mechanism;
   wherein,
   speed of the self-propelled device can be regulated through the speed regulating cable;
   the regulating mechanism further comprises a regulating sleeve and a speed regulating sleeve connected to the push handle;
   the regulating sleeve is connected to the self-propelled lever, and the speed regulating sleeve is connected to the speed regulating cable;
   the self-propelled lever pulls the regulating sleeve and causes the speed regulating sleeve to move simultaneously with the regulating sleeve, so as to pull the speed regulating cable, and the speed regulating sleeve can move relative to the regulating sleeve, so as to pull the speed regulating cable
   the regulating sleeve comprises a connecting sleeve connected to the self-propelled lever, and a rotating sleeve coaxially connected to the connecting sleeve and capable of rotating, and the rotating sleeve is in threaded connection with the speed regulating sleeve, with a circumferential stop means disposed between the speed regulating sleeve and the push handle to prevent the speed regulating sleeve from rotating relative to the push handle;
   the regulating sleeve and the rotating sleeve are sleeved on the push handle.

2. The stepless speed regulating control mechanism of claim 1, wherein the speed regulating sleeve comprises a first section in threaded connection with the rotating sleeve, and a second section connected with the speed regulating cable, an internal surface of the rotating sleeve being provided with internal treads, and an external surface of the first section of the speed regulating sleeve being provided with external threads for connection with the rotating sleeve.

3. The stepless speed regulating control mechanism of claim 2, wherein the connecting sleeve comprises an inner sleeve, and an outer diameter of the inner sleeve is smaller than an inner diameter of the rotating sleeve and one end of the inner sleeve is plugged in the rotating sleeve;
   a retainer ring is disposed on one end of the inner sleeve and retained on an inner shoulder of the rotating sleeve;
   an outer sleeve is fixedly sleeved on an outside portion of the inner sleeve that is exposed from the rotating sleeve, and an outer diameter of the outer sleeve is greater than an inner diameter of the rotating sleeve.

4. The stepless speed regulating control mechanism of claim 2, wherein a guide bar is sleeved between each of the regulating sleeve and the speed regulating sleeve and the push handle;
   the guide bar is fixedly connected to the push handle, and the regulating sleeve and the speed regulating sleeve are capable of rotating around the guide bar;
   a circumferential stop means is defined by a protruded ridge disposed on an external surface of the guide bar and extending axially along the guide bar, and a groove is defined in the internal surface of the speed regulating sleeve and matching with the protruded ridge;
   a groove matched with the protruded ridge is also defined on an internal surface of the connecting sleeve.

5. The stepless speed regulating control mechanism of claim 1, wherein the self-propelled lever is connected to the regulating sleeve by a connecting cable.

6. The stepless speed regulating control mechanism of claim 5, wherein the push handle further comprises two long arms extending up and backwardly from two sides of the base, and a holding portion between the two long arms;
   the self-propelled lever further comprises two lateral portions located on two sides and an intermediate portion connected to the two lateral portions;
   ends of the lateral portions are hinged to the long arms.

7. The stepless speed regulating control mechanism of claim 6, wherein the self-propelled lever is located below the holding portion of the push handle;
   the regulating mechanism is disposed on one of the long arms;
   the self-propelled lever pulls the speed regulating cable to move upwards when moving up and towards the holding portion.

8. The stepless speed regulating control mechanism of claim 1, wherein a return spring is connected between the shell of the self-propelled device and the base, and the return spring enables the self-propelled device to slant forward.

9. The stepless speed regulating control mechanism of claim 1, wherein the distance of the speed regulating cable pulled by the self-propelled lever is greater than or equal to that of the speed regulating cable pulled by the regulating mechanism.

* * * * *